Nov. 6, 1951     A. A. HICKMAN ET AL     2,574,182

PIPE JOINT

Filed Sept. 12, 1947

INVENTORS
AUGUSTUS HICKMAN
LAURENCE HENDERSON
ALFRED PATRIACCO

BY

ATTORNEY.

Patented Nov. 6, 1951

2,574,182

UNITED STATES PATENT OFFICE 2,574,182

PIPE JOINT

Augustus A. Hickman, Brooklyn, and Lawrence O. Henderson and Alfred Patriacco, New York, N. Y.

Application September 12, 1947, Serial No. 773,580

1 Claim. (Cl. 285—120)

This invention relates to new and useful improvements in lubrication applicators.

The invention provides a device comprising relatively few, rugged, inexpensive and readily interchangeable parts whereby the latter can be variously arranged to produce one type of lubrication applicator or adapter for acting in an ideal way in connection with certain lubrication tasks or to produce another type of lubrication applicator or adapter for acting in an ideal way in connection with certain other lubrication tasks; with the result that the invention may be said to provide a universal applicator or adapter, in the sense that, according as the parts are arranged in one assembly or another, proper coaction of the applicator will be had with different lubrication problems to be encountered wherever a lubricant is to be applied, such, for instance, as are found in all types of industrial machines, in the aeronautical field, and in connection with farm implements and automotive vehicles.

A feature of the device is that with all the parts used in one of said assemblies, and with less than all the parts used in the other assembly, merely five parts in all are employed.

Another feature is that two of the five parts are used in both assemblies, while only three parts are used in one of the assemblies.

A further feature is that no yieldable washers, gaskets or the like are present, and so long-continued perfect operability of the device is not dependent on renewal and replacement of the comparatively short-lived elements just referred to. The merely five parts are all of metal; three desirably of brass or the like, and two desirably of a harder metal, as steel. The functions of the five parts are such that with the two last-mentioned parts of a hard metal, as steel, to minimize wear thereon, the entire device will be of exceedingly long life despite some gradual wear of the parts other than the steel ones.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Figure 1:
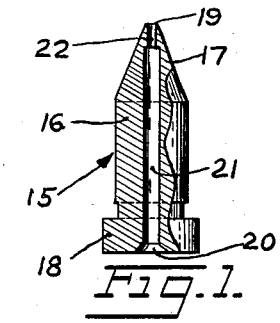
Fig. 1 shows, partially in elevation and partially in section, one of the aforesaid two parts used in both assemblies, this part being a lubricant discharge nozzle-member which desirably is made of steel.
Figure 2:
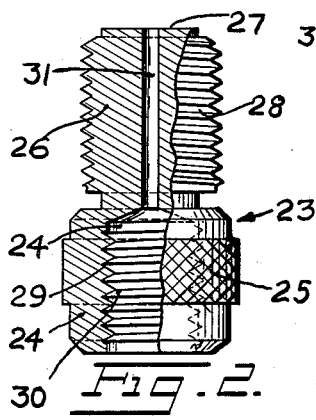
Fig. 2 is a similar view, showing the other of the aforesaid two parts used in both assemblies, this part being a base-sleeve which desirably is made of brass.

The lubrication applicator, according to the first form of the present invention shown in Figs. 1 to 4, includes a nozzle 15 having a cylindrical stem 16 and a conical upper portion 17. At its bottom said nozzle member has a cylindrical base 18. At the pointed upper tip of the nozzle member is a discharge port 19, to which lubricant is adapted to be supplied through a passage extending axially of the member 15; said passage comprising an upwardly tapered bottom portion 20, above said bottom portion a bore 21 of the same diameter as the minimum diameter of such taper, and, between the bore 21 and the port 19, a bore 22 of smaller diameter than the bore 21.

This nozzle 15 is preferably made of steel; the steel recommended being drill rod, heat-treated to obtain maximum hardness.

The base-sleeve, marked as a whole 23, is made of brass as above, and is a cylindrical part turnable from ⅝" round rod stock. The same comprises a lower portion 24, circumferentially enlarged intermediate its ends and there having a coarse knurling 25, and an upper diametrically reduced portion 26, capped by a flat disc formation 27 and therebelow having an external thread 28. The lower portion 24 is cylindrically chambered at 29, and there provided with an internal thread 30. Extended between the top of the chamber 29 and the top of the base-sleeve 23, axially thereof, there is a passage 31 of circular cross section.

Figure 4:
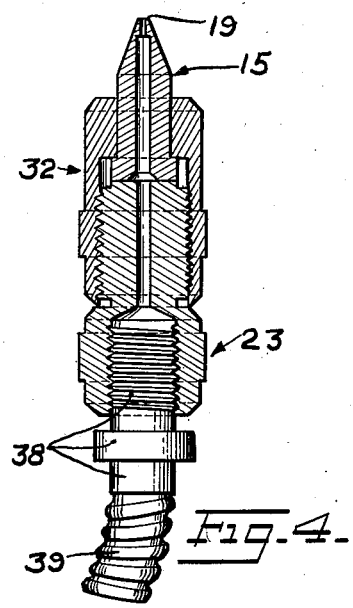
Fig. 4 shows said assembly in axial section, and as coupled to a lubricating feeding means shown in elevation.

To complete the assembly indicated in Fig. 4, a casing-sleeve 32, is provided. This part, also, is made of brass, and also is a cylindrical piece turnable from 5/8" round rod stock.

The casing-sleeve 32 comprises a main body 33, circumferentially enlarged at its bottom and there coarse-knurled as at 34. The lower portion of said body is cylindrically chambered at 35, the lower part of said chamber having an internal thread 36. The chamber 35 above said thread is of a diameter to afford a snug sliding fit around the base 18 of the nozzle member 15. Above said chamber and coaxial therewith is an axial bore 37 of a diameter to afford a snug sliding fit around the stem 16 of the nozzle member. The thread 36 matches the thread 28 on the base-sleeve 23.

To assemble the parts as shown in Fig. 4, the nozzle member 15 is merely inserted upward all the way into the casing-sleeve 32, thereby to project beyond the top of the latter the upper portion of the stem 16; and then the base-sleeve 23 is applied, and the parts are locked together as shown by spirally tightening the base-sleeve 23 in the casing-sleeve 32.

The internal thread 30 of the base-sleeve 23 matches the standard external thread of the fitment provided at the discharge end of a flexible hose leading from a lubricant supply source, as a hand-pump, or a lubricant tank served by compressed air or other pressure agent. In Fig. 4, such a fitment 38, on the discharge end of a flexible hose 39 from a lubricant supply source, is shown inserted in and threadedly coupled with the base-sleeve 23.

The relatively large opening in the fitment 38, as compared with the size of the passages through the base-sleeve 23 and the nozzle member 15, to the tiny port 19, and the fact that the passage (20—21—22, Fig. 1) through the part 15 is first upwardly tapered and thereabove further stepped down in diameter, result in a high pressure build-up, so that the lubricant issuing from the port 19 is discharged under exceedingly high pressure.

The assembly just described is used, for example, for the lubrication of metal or leather covered springs, such as are commonly encountered in automobiles. Where such covering is of metal, a one-quarter inch lubrication hole is, as is well known, provided in the covering under the rear spring leaf. To lubricate the spring, the pointed projected end of the nozzle member 15 is inserted through said hole and thus penetrates the canvas backing laid over the spring. When the spring is fully grease-packed, the overflow can be noted at the end of the spring and shackle.

The assembly of Fig. 4 is also perfectly adapted for lubricant spraying of spring leaves when not metal covered, and for innumerable other lubrication inlets and parts to be lubricated in the automotive vehicle field and elsewhere.

Figure 6:
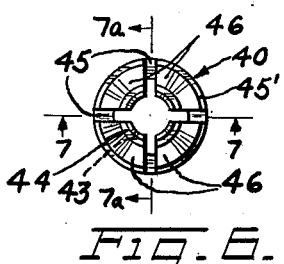
Fig. 6 is a top plan view of the chuck.
Figure 5:
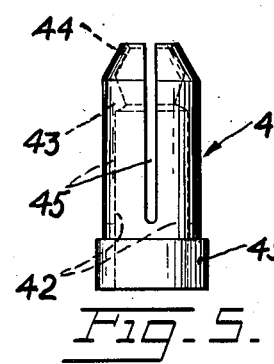
Fig. 5 is a side elevation, showing a spring chuck, the other of the two parts desirably made of steel, such chuck being used only in the assembly other than the one shown in Fig. 4.
Figure 3:
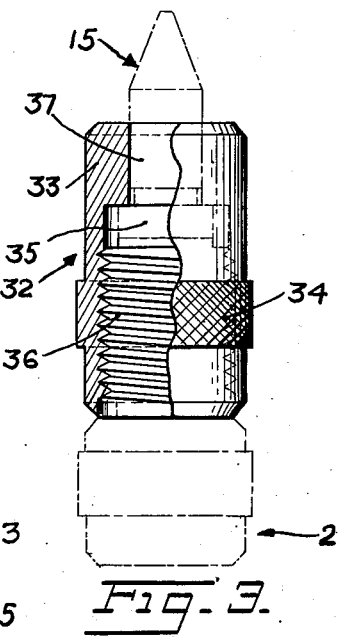
Fig. 3 shows, in full lines, and partially in elevation and partially in section, the complementary casing-sleeve, also desirably made of brass, used in only one of the assemblies; this view also illustrating said assembly, in which latter the parts of Figs. 1 and 2 are indicated in dot and dash lines.
Figure 7:
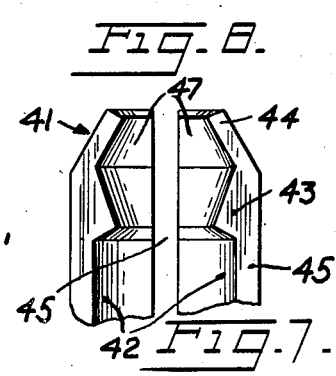
Fig. 7 is a fragmentary enlarged view, being a section taken on either of the lines 7—7 or 7ª—7ª of Fig. 6.
Figure 9:
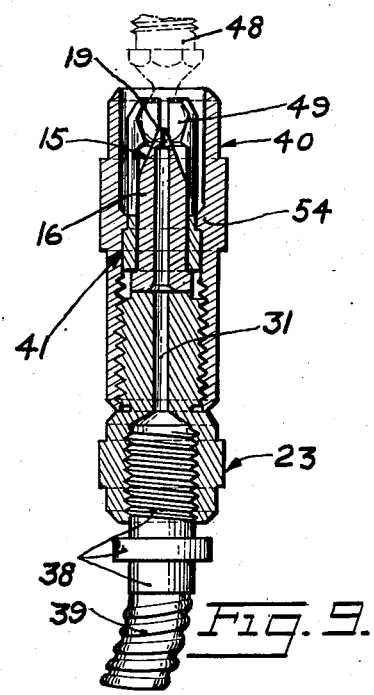
Fig. 9 is a view similar to Fig. 4, but showing the assembly last referred to, and also, in dot and dash lines, use of this assembly in connection with a familiar lubricant intake fitting having a ball-shaped nipple and frequently referred to as the Zerk type of intake fitting.

In the assembly of Fig. 9, the parts 16 and 23 are also used, but for the casing-sleeve 32 there is substituted a longer casing-sleeve 40, and there is added to the assembly the spring chuck 41 shown in Figs. 5–7.

The chuck 41, of collet type, is made of the steel known as Maxel #4, heat-treated for temper. The chuck is cylindrical, having a central bore 42 which is cylindrical up to the point where near the top of the chuck the internal annular formations 43 and 44 are provided. Spaced 90° apart around the chuck are four long straight slots 45, all parallel with the axis of the chuck, and extending from the top thereof down to near the top of a bottom circumferential enlargement 45'.

The slots 45 provide four stiffly resilient fingers 46 for constituting the upper end portions thereof spring jaws for releasably gripping a ball-shaped nipple of a size to be forcibly entered into and withdrawn from the gripping pocket 47 established between the formations 43 and 44. Said object is the ball-shaped nipple of the aforesaid Zerk type of lubricant intake fitting; this fitting being shown in dot and dash lines at the top of Fig. 9, where the fitting is marked 48 and and the nipple 49.

The longer casing-sleeve 40 is also made of brass, and also is a cylindrical part turnable from 5/8" round rod stock. This casing-sleeve 40 intermediate its ends has a circumferential enlargement coarse-knurled as at 50; and centrally thereof said part has an upper bore 51 and a somewhat smaller lower bore 52, the latter having an internal thread 53 matching the external thread 28 at the upper portion of the base-sleeve 23. Between the bores 51 and 52 there is an internal annular rib 54 having flat top and bottom surfaces and surrounding an intermediate bore 55 coaxial with the bores 51 and 52.

In the assembly of Fig. 9, the parts 15, 41, 40 and 23 are arranged as there shown; with the spring jaws of the chuck 41 having their tops within and almost at the level of the top of the casing-sleeve 40, and with the chuck thus positioned as the result of its enlargement 45' being disposed between the annular rib 54 in said casing sleeve and the enlargement 18 at the bottom of the nozzle member 15 now housed in the chuck, and as the result of completing the assembly by coupling into the same the base-sleeve 23 and spirally tightening up the latter.

Figure 8:
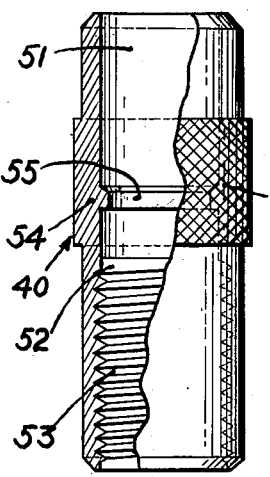
Fig. 8 shows, partially in elevation and partially in section, a casing-sleeve, also desirably made of brass but longer than the casing-sleeve of Fig. 3, and substituted for the latter in the assembly other than the one shown in Fig. 4.

The bore surrounded by the annular rib 54 (that is, the bore 55 of Fig. 8) is of a diameter to afford a snug sliding fit around the main upper length of the chuck 41, and the cylindrical bore through the chuck (that is, the bore 42 of Fig. 7) is of a diameter to afford a snug sliding fit around the stem 16 of the nozzle member 15, while the engagement between the top of the base-sleeve 23 and the base of the nozzle member is the same flatwise and lubricant-tight one as in the assembly of Fig. 4.

With this assembly of Fig. 9, as with that of Fig. 4, both including the base-sleeve 23, may be coupled up the standard parts 38 and 39 as shown, for supplying lubricant under pressure to the various passages leading to the discharge port 19.

The bore of maximum diameter in the casing-sleeve 41 (that is, the bore 51 of Fig. 8), is of a diameter large enough to allow sufficient spread of the chuck jaws to allow the ball-shaped nipple 49 of the Zerk-type lubricant intake fitting 48 to be forced into the chuck to be releasably gripped thereby.

Then, as indicated in Fig. 9, the pointed end of the nozzle member 15 enters into the lubricant inlet port (not shown) at end of the ball-shaped nipple 47.

Now, a perfect union being effected between such inlet port and the nozzle member 15, with leakage here not permitted, the grease is driven under very high pressure through the intake fitting and into the parts to be lubricated. What are known to auto-mechanics as frozen shackles are immediately lubricated, without the use of a bar. In the event that what is called an impossible frozen shackle, the device of the invention will stop compressor operation without the loss of grease.

In the case of automotive vehicles, to continue to point out the advantages of the invention in that field alone for instance, complete lubrication of any type of vehicle may be usually accomplished in from seven to ten minutes, depending upon the speed of the operator.

The device contains no washers, gaskets or springs. All possible wear is metal against metal. The only part possibly requiring replacement is the nozzle member 15, and this only after long and continuous wear and hard usage, as where a careless operator neglects to wipe all fittings. When given ordinary careful use, this nozzle member will have a life measured by at least five hundred complete lubrication jobs. When properly tempered, the chuck will have an incalculably long life. As for the brass parts, only a loss of any of such will necessitate a replacement.

While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention, what we claim as new and desire to secure by United States Letters Patent is:

A combination lubrication adapter including a base-sleeve chambered and internally threaded for attachment to an externally threaded lubricant supplying fitment associated with a lubricant source means, a casing-sleeve, said two sleeves having coacting threads whereby they may be coupled end to end, a nozzle member insertable within said casing-sleeve, said nozzle provided with a pointed end having a discharge port associated therewith, a passage through the length of the nozzle communicating with the discharge port, stop means associated with said nozzle comprising a circumferential shoulder defined intermediate the length of said nozzle by an enlarged base end formed integrally with said nozzle remote to said discharge port, stop means in the casing-sleeve comprising a circumferential shoulder formed internally thereof and intermediate the length of the sleeve, and means associated with the base-sleeve for impingement upon the enlarged base end of the nozzle whereby coactive rotation of said threaded sleeves will impart rotation to said nozzle and the subsequent impingement of the two aforementioned stop means.

AUGUSTUS A. HICKMAN.
LAWRENCE O. HENDERSON.
ALFRED PATRIACCO.

REFERENCES CITED

The following references are of record in the file of this patent:

UNITED STATES PATENTS

| Number | Name | Date |
|---|---|---|
| 16,450 | Phillips | Jan. 20, 1857 |
| 1,734,288 | Davis | Nov. 5, 1929 |
| 2,056,249 | Bystricky | Oct. 6, 1936 |
| 2,274,251 | Stanley | Feb. 24, 1942 |